US012805535B2

(12) United States Patent
Han et al.

(10) Patent No.: US 12,805,535 B2
(45) Date of Patent: Nov. 24, 2026

(54) SHELF STABLE AGGREGATE FOOD AND METHODS

(71) Applicant: General Mills, Inc., Minneapolis, MN (US)

(72) Inventors: Linghua Ann Han, Plymouth, MN (US); Elizabeth Lomauro Igo, Maple Grove, MN (US); Alexandra Martinez-Ropes, Plymouth, MN (US); Olivia Murch, Minneapolis, MN (US); Emily Ryks, Maple Grove, MN (US)

(73) Assignee: General Mills, Inc., Minneapolis, MN (US)

( * ) Notice: Subject to any disclaimer, the term of this patent is extended or adjusted under 35 U.S.C. 154(b) by 39 days.

(21) Appl. No.: 17/689,616

(22) Filed: Mar. 8, 2022

(65) Prior Publication Data

US 2022/0287338 A1 Sep. 15, 2022

Related U.S. Application Data

(60) Provisional application No. 63/158,577, filed on Mar. 9, 2021.

(51) Int. Cl.

| | |
|---|---|
| ***A23B 2/754*** | (2025.01) |
| ***A23B 2/733*** | (2025.01) |
| ***A23L 5/10*** | (2016.01) |
| ***A23L 29/281*** | (2016.01) |
| ***A23L 29/30*** | (2016.01) |

(52) U.S. Cl.
CPC .............. *A23B 2/754* (2025.01); *A23B 2/733* (2025.01); *A23L 5/10* (2016.08); *A23L 29/281* (2016.08); *A23L 29/35* (2016.08)

(58) Field of Classification Search
None
See application file for complete search history.

(56) References Cited

U.S. PATENT DOCUMENTS 5,137,745 A * 8/1992 Zukerman ............... A23P 20/20 426/512

FOREIGN PATENT DOCUMENTS

| | | | |
|---|---|---|---|
| EP | 1435204 | 7/2004 | |
| EP | 2377407 | 10/2011 | |
| EP | 2636316 | 9/2013 | |
| WO | WO-0221937 A2 * | 3/2002 | ............. A23L 7/126 |
| WO | WO 2004/016116 | 2/2004 | |
| WO | WO-2014124005 A1 * | 8/2014 | ........... A23C 9/1315 |

* cited by examiner

*Primary Examiner* — Nikki H. Dees
*Assistant Examiner* — Deborah Liu
(74) *Attorney, Agent, or Firm* — Jordan IP Law, LLC; John L. Crimmins, Esq.

(57) ABSTRACT

A shelf stable aggregate foods are described that include a relatively low amount of binder, such as a dairy binder or maltodextrin binder. Methods of making a shelf stable aggregate food include the forming a moist aggregate using a positive displacement method.

10 Claims, 3 Drawing Sheets

SHELF STABLE AGGREGATE FOOD AND METHODS

CROSS REFERENCE TO RELATED APPLICATIONS

This application claims the benefit of U.S. Provisional Patent Application Ser. No. 63/158,577, which was filed on Mar. 9, 2021 and titled "Shelf Stable Aggregate Food and Methods". The entire content of this application is incorporated by reference.

BACKGROUND

Consumers enjoy convenient snack foods that provide a variety of eating experiences. Convenient, shelf stable snack foods are available in various forms, such as snack mixes and snack bars. Shelf stable snack foods provide a number of benefits to consumers. They are generally ready-made without requiring refrigeration or preparation; they can often be consumed without needing utensils; and they provide a variety of flavors and textures to satisfy a wide array of cravings. However, as consumers increasingly look for savory snack options, while there are many bite sized piece options, there are fewer options available in bar form or aggregate form.

SUMMARY

The present disclosure relates to a shelf stable aggregate food.

A shelf stable food is provided herein. In some embodiments, the shelf stable food has a shelf life at room temperature of at least 1 month and includes particulates in an amount of about 85% to about 91% by weight of the food; and a binder in an amount of about 9% to about 15% by weight of the food, the binder binding the particulates together and consisting of a dairy binder. In some embodiments, a shelf stable food can further include a fat in amount of up to about 4% by weight of the food. In some embodiments of a shelf stable food, particulates can include permeable particulates in an amount of up to 40% by weight of the particulates. In some embodiments the permeable particulates can be included in an amount of about 20% to about 30% by weight of the particulates. In some embodiments, the permeable particulates can include protein crisps. In some embodiments of a shelf stable food, the dairy binder can include a cheese.

A method of making a shelf stable food is also provided herein. In some embodiments, a method includes combining an amount of dairy powder with particulates to form powder coated particulates; combining the powder coated particulates with an amount water to form a moist aggregate, where the moist aggregate includes the particulates in an amount of from about 60% to about 85% by weight of the moist aggregate and a hydrated dairy powder having a moisture content of 30% to 70%; forming the moist aggregate into pieces using a positive displacement molding method; and setting the structure of the hydrated dairy powder to form a dairy binder in the shelf stable food, the shelf stable food having a shelf life at room temperature of at least 1 month and including the particulates in an amount of about 85% to about 91% by weight of the shelf stable food with the dairy binder binding the particulates together. In some embodiments, the amount of water can be sufficient to produce a hydrated dairy powder that has a moisture content of about 40% to about 60%. In some embodiments, the amount of dairy powder can be from about 10% to about 15% by weight of the moist aggregate. In some embodiments, the amount of water can be from about 6% to about 15% by weight of the moist aggregate. In some embodiments, the step of setting the structure can include baking the pieces at a temperature of about 250° F. to about 330° F. for a time of about 5 minutes to about 15 minutes. In some embodiments, the positive displacement molding method can include piston molding.

In some embodiments, a method includes combining an amount of maltodextrin powder with particulates to form powder coated particulates; combining the powder coated particulates with an amount of water to form a moist aggregate, where the moist aggregate includes the particulates in an amount of from about 50% to about 75% by weight of the moist aggregate and a hydrated maltodextrin powder having a moisture content of 30% to 70%; forming the moist aggregate into pieces using a positive displacement molding method; and setting the structure of the hydrated maltodextrin powder to form a binder in the shelf stable food, the shelf stable food including the particulates in an amount of about 65% to about 85% by weight of the shelf stable food with the binder binding the particulates together. In some embodiments, the binder can contribute less than 10% sugar by weight of the shelf stable food. In some embodiments, the shelf stable food can include from about 4% to about 8% maltodextrin by weight. In some embodiments, the amount of water can be from about 5% to about 10% by weight of the moist aggregate. In some embodiments, the step of setting the structure can include baking the pieces. In some embodiments, the step of setting the structure can include baking the pieces at a temperature of about 275° F. to about 375° F. for a time of about 5 minutes to about 15 minutes. In some embodiments, the positive displacement molding method can include piston molding.

These and various other features and advantages will be apparent from a reading of the following detailed description.

DRAWINGS

DETAILED DESCRIPTION

Figure 1:
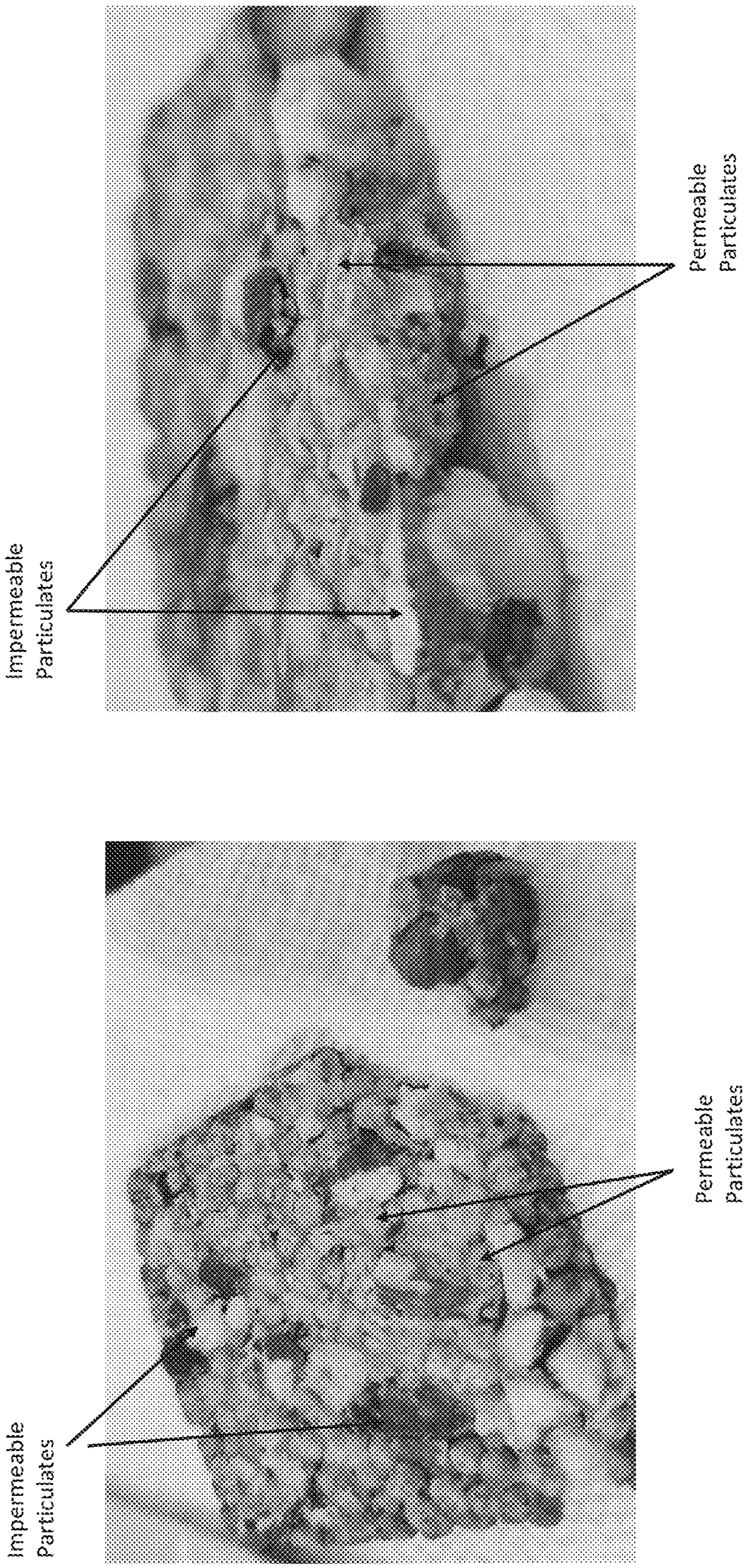
FIG. 1 is a picture of an embodiment of a shelf stable food provided herein, which includes a parmesan cheese binder and is flavored with a chili powder. The food is formed as a wafer, with a close up on the right, and has visible impermeable particulates (whole nuts, nut pieces, and seeds) and permeable particulates (protein crisps) with little visible binder.

Although savory shelf stable snack foods are readily available as snack mixes, shelf stable snack bars have far fewer savory options. While some savory snack bars exist, such snack bars offer limited eating flavor and texture experiences. Shelf stable snack bar options, such as granola bars, that include aggregates of particulates often rely on sugars and sugar syrups (e.g., corn syrup), which some consumers prefer to avoid, to bind the particulates together. Sugar-based binders also introduce sweetness to such snack bars, which limits the ability to formulate them with enjoyable savory flavors. In many cases, to ensure that the particulates in an aggregate type snack bar remain bound together during processing and shelf life, the amount of binder can often exceed 20% by weight of the finished product, regardless of sugar content, which can interfere with perception of flavors of the particulates. As a result, there is a need for technologies that enable the development of more flavor options for shelf stable aggregate snack foods, especially crunchy snack bars.

It was discovered, and is disclosed herein, that employing a positive displacement molding method can enable the use of a surprisingly low amount of binder (e.g., about 9% to about 15% by weight of the finished product) to produce a shelf stable aggregate snack food without being too fragile to manufacture and distribute. A shelf stable food has a shelf life of at least 1 month (e.g., at least 3 months, or at least 6 months) in a package at room temperature.

In addition, this discovery provides the ability to use unique binders that contribute little to no sweetness to the final product. In some cases, a binder used herein can contribute less than 10% (e.g., less than 8% or less than 1%) sugar by weight of the final product. By reducing the amount of binder necessary to stably bind particulates together, and enabling the use of low or no sugar binders, the innovation described herein provides the ability to produce shelf stable aggregate foods with a wide variety of flavors without flavor interference from large amounts of binder or sugar in the binder.

Shelf Stable Foods

A shelf stable food described herein comprises an aggregate, where particulates are bound together with a binder. A shelf stable food includes a relatively low amount of binder (e.g., about 9% to about 15%, or about 10% to about 15% for a dairy binder, and about 15% to about 35%, or about 15% to about 30% for a maltodextrin binder) by weight of the food. As used herein, the term "binder" refers to a composition including one or more rigid component that binds particulates together. Suitable binders can include, for example, a dairy binder or a maltodextrin binder.

A "dairy binder" refers to a binder consisting essentially of (i.e., at least 98%, or at least 99% by weight) a dairy ingredient that binds particulates together. A dairy binder is formed by at least partially hydrating a dairy powder to form a hydrated dairy powder and setting the structure of the hydrated dairy powder to cause components of the hydrated dairy powder to become rigid to bind particulates together. Examples of appropriate dairy powders include are those made from dehydrating a dairy product (e.g., milk, cheese, or fermented milk) to produce a powder, for example, any one or a combination of powdered cheese (e.g., powdered cheddar, powdered mozzarella, powdered bleu cheese, powdered parmesan, powdered cream cheese), powdered milk (e.g., non-fat dry milk, powdered whole milk, powdered reduced fat milk), other powdered fermented milk (e.g., powdered yogurt, powdered buttermilk, powdered kefir), and the like. A dairy powder can contain non-dairy components that were included in the original dairy product, such as salt, enzymes, microorganisms, or colorants that are found in cheeses or yogurt. It is preferred that a dairy binder contains only sugars of the types (e.g., lactose) and amounts that are native to the dairy powder used to make the binder. For example, a non-fat dry milk binder can contain around 50% by weight lactose, while a cheddar binder can contain lower amounts of lactose. It is to be understood that a dairy powder can contain minor amounts (less than 2%, less than 1%, or less than 0.5% by weight) of non-dairy components that were not included in the original dairy product, such as an anti-caking ingredient.

A "maltodextrin binder" refers to a binder including at least 50% (e.g., 50% to 100%) by weight maltodextrin that binds particulates together. In some cases, a maltodextrin binder can include a sugar in an amount of up to 50% that can contribute to binding of particulates. In some embodiments, a maltodextrin binder can include less than 10% (e.g., less than 5%, less than 1%, or 0%) by weight sugar. Although a maltodextrin binder can contain less than 10% sugar, or even no sugar, it has been found that some sugar in a maltodextrin binder (e.g., about 25% to about 50% of the maltodextrin binder) can provide a more desirable crunchy texture and/or an improved flavor. In some embodiments, a maltodextrin binder can contribute less than 10% (e.g., less than 5%, less than 1%, or 0%) sugar by weight of a shelf stable food.

A shelf stable food provided herein includes a relatively large proportion of particulates. Although particulate content by weight can vary due to variations in density of particulates, in some cases, a shelf stable food can contain from about 65% to about 91%, with a range of about 81% to about 91% (e.g., about 85% to about 90%) particulates by weight of a food with a dairy binder, and a range of about 65% to about 85% (e.g., about 70% to about 85%) particulates by weight of a food with a maltodextrin binder.

Particulates in a shelf stable food can be any desired size range. However, it is preferred that particulates in a shelf stable food be of sufficient size to be visually identifiable. For example, in some embodiments, at least 50% (e.g., at least 60%, or at least 80%) by weight of particulates in a shelf stable food can be sized such that they are retained on a 2 mm opening on a sieve (e.g., No. 8 mesh sieve). In some embodiments, at least a portion (e.g., at least 20%, at least 25%, at least 30% by weight) of particulates in a shelf stable food can be sized such that they are retained on a 4 mm opening on a sieve (e.g., No. 5 mesh sieve). In some embodiments, at least a portion (e.g., at least 10%, at least 15%, or at least 20% by weight) of particulates a shelf stable food can be sized such that they are retained on a 6.35 mm opening on a sieve (e.g., ¼ inch mesh sieve, or a 16/64 round hole sieve).

Particulates in a shelf stable food can be permeable or impermeable, or a mixture of permeable and impermeable particulates. As used herein, a particulate is considered "permeable" if it can readily absorb moisture or oil. Permeable particulates can be identified as porous. Examples of permeable particulates include, for example, rolled or flaked grains (e.g., rolled oats, barley flakes, and the like), puffed grains or seeds (e.g., puffed rice, popped corn, and the like), protein-based puffs (e.g., soy puffs, milk protein puffs, and the like), freeze dried fruits or vegetables, and the like.

As used herein, an "impermeable particulate" refers to a particulate that does not readily absorb moisture or oil. Examples of impermeable particulates include, for example, nuts (e.g., almonds, peanuts, and the like), seeds (e.g., sunflower seeds, sesame seeds, and the like), fat-based confections (e.g., chocolate pieces, flavored chips, and the like), and leathery dried fruits (e.g., raisins, dried cranberries, and the like). It is to be understood that some seeds that are high in mucilaginous fiber (e.g., chia seeds) can absorb water over time due to hydration of the fiber, but may be included as an impermeable particulate so long as a binder can be set before significant hydration of the fiber occurs.

In some embodiments, a shelf stable food can include permeable and impermeable particulates, where the permeable particulates are included in an amount of up to 40% (e.g., from 0% to 40%, from about 15% to about 35%, or about 20% to about 30%) by weight of the particulates. Permeable particulates can impart a crisp texture in a shelf stable food that provides an enjoyable contrast with the texture of impermeable particulates. In some embodiments, including permeable particulates in an amount exceeding 40% by weight can result in too little binder available to bind particulates together due to absorption by the permeable particulates prior to setting the binder. It is to be understood, however, that a shelf stable food provided herein need not include any permeable particulates to remain intact during production and distribution.

In some embodiments, a shelf stable food can include a fat in an amount of up to 4% (e.g., 0% to 4%, 2% to 3.5%, 2.5% to 3.5%, or about 3%) by weight of the shelf stable food. As used herein, an oil It is to be understood, that a fat that is used in a shelf stable food refers to a fat that is separately added rather than fats and oils that are native to particulates, such as fats and oils naturally found in nuts and seeds, or fats and oils native to a dairy powder. A fat suitable for inclusion in a shelf stable food can be any edible fat or oil. Examples of suitable fats and oils include, for example, canola oil, coconut oil, palm oil, butter, margarine, lard, peanut oil, sunflower oil, algae oil, sesame seed oil, and the like. A fat need not be included in a shelf stable food provided herein, but a fat included in an amount of up to 4% by weight can reduce perceived dryness of a shelf stable food upon eating. In some cases, an amount of fat greater than 4% can be included, however it has been observed that such amounts can result in increased oil migration from a shelf stable food during manufacture and/or during shelf life.

Other ingredients suitable for inclusion in a shelf stable food provided herein include, for example, spices, herbs, or other natural or artificial flavorants to achieve a desired flavor profile, natural or artificial colorants, and the like. In some embodiments, a shelf stable food provided herein can contain no artificial ingredients.

Methods

Generally, a shelf stable food provided herein can be made by producing a moist aggregate that includes particulates and a hydrated powder, forming the moist aggregate into pieces using a positive displacement method, and then setting the structure of the hydrated powder to form a binder that binds the particulates together.

A moist aggregate can be made by combining particulates with a dairy powder and/or an amount of maltodextrin powder to form powder coated particulate, which are then combined with an amount of water to form the moist aggregate.

In some cases, particulates and a dairy powder or maltodextrin powder can be combined at a rate of about 9% to 20% by weight dairy powder or maltodextrin powder to about 80% to 91% by weight particulates, such that at least some of the dairy powder or maltodextrin powder is attached to surfaces of the particulates. It is to be understood that not all of an amount of a dairy powder or maltodextrin powder combined with particulates to form powder coated particulates need be in contact with a surface of a particulate when combined with water to form a moist aggregate. That is, as used herein, powder coated particulates include particulates with a dairy powder or maltodextrin powder coating a surface, and in some embodiments, can include a portion the amount of dairy powder or maltodextrin powder that is not coating particulate surfaces in addition a portion of the amount of dairy powder or maltodextrin powder that is coating particulate surfaces. Combining an amount of dairy powder and/or maltodextrin powder with particulates can improve even distribution of binder in the final product. In addition, dairy powder and/or maltodextrin powder coating particulate surfaces can ensure that the dairy powder and/or maltodextrin powder becomes sufficiently hydrated before any permeable particulates absorb moisture, which can, in some cases, have an added benefit of increasing interaction of binder with particulates to strengthen the binder in the final product, as discussed above.

In some embodiments, other dry or powdered ingredients (e.g., seasonings or other flavorants, salts, or colorants) can be included during or after formation of powder coated particulates.

An amount of water combined with powder coated particulates can be sufficient to achieve a hydrated dairy powder or hydrated maltodextrin powder with a moisture content of 30% to 70% (e.g., about 40% to about 60%, or about 45% to about 55%). It is to be understood that, if permeable particulates are included in a moist aggregate, the actual moisture content of a hydrated dairy powder or hydrated maltodextrin powder can be slightly less, as permeable particulates can sequester some of the amount of water combined with powder coated particulates. It has been observed that an amount of water suitable for forming a moist aggregate from powder coated particulates that include a dairy powder can result in a hydrated dairy powder having a creamy consistency. A moist aggregate can have a particulate content of about 50% to about 85% (e.g., about 60% to about 85%, or about 65% to about 80%) by weight of the moist aggregate, depending on the amount of dairy or maltodextrin powder used and the amount of water used. In some embodiments, a moist aggregate can include from about 6% to about 15% (e.g., about 10% to about 15%) dairy powder or about 4% to about 15% (e.g., about 4% to about 8%) maltodextrin powder and about 5% to about 15% (e.g., from about 8% to about 12%) water by weight of the moist aggregate.

Water used to make a moist aggregate can be provided as plain water, or as water content in an aqueous fluid. For example, a fruit or vegetable juice, a liquid seasoning, a salt solution, a liquid milk, or a suspension or a slurry containing a colorant or flavorant can contribute some or all of the amount of water used to produce a moist aggregate. For example, a liquid seasoning, such as chili sauce can contribute water in a moist aggregate.

In some embodiments, a fat can be combined with powder coated particulates at the same time an amount of water is added to form a moist aggregate. In some embodiments, a fat can be combined after a moist aggregate is formed. A fat can be added as a liquid (e.g., as a liquid oil or melted fat) or a solid. In some cases, a liquid fat can be used to ensure even distribution throughout a moist aggregate.

Although not necessary, in some embodiments, a moist aggregate can be held for some time (e.g., up to 2 hours) prior to forming. A hold time can be useful when a moist aggregate is formed in batches prior to forming.

A shelf stable food provided herein is made by forming a moist aggregate into pieces using a positive displacement molding method. Although positive displacement molding methods and equipment have been used to form foods, it was previously considered inappropriate for forming aggregate foods with low binder content because it was believed that positive displacement molding wouldn't be able to apply sufficient pressure to a moist aggregate with low binder content to achieve sufficient cohesion in the moist aggregate. However, it was discovered that positive displacement molding could be particularly used to mold a moist aggregate described herein, including a dairy binder or a maltodextrin binder, because the described moist aggregate does not require high levels of cohesion to achieve effective binding once the binder is set. That is, positive displacement can provide enough pressure on a described moist aggregate in a mold to ensure a moist aggregate structure where particulates and binder are in sufficient contact to result in particulate binding once the binder is set, and removal from the mold by positive displacement does not significantly break, crush, or grind particulates or disrupt the moist aggregate structure prior to setting the binder.

As used herein, the term "positive displacement molding method" refers to the use of equipment that can form a moist aggregate in a mold, and then displace the formed moist aggregate from the mold using, for example, a piston or air. Equipment appropriate for use in a method described herein can be used to produce a food at a commercial scale (e.g., hundreds or thousands of pieces of formed aggregate an hour). Appropriate equipment includes, without limitation, molding equipment such as those manufactured by Sollich KG, Germany (e.g., Cluster Former CF), Selpak, Australia (e.g., Rotodepositor 2016), OKA-Spezialmaschinenfabrik, Germany (e.g., Piston-Rollerformer Type FEC) that use a piston for positive displacement from the mold (piston molding equipment), and molding equipment such as those manufactured Sollich KG, Germany (e.g., Sollcoform) and Kruger & Salecker Maschinenbaeu GmbH, Germany (e.g., Cereal Moulding GFT 0200-0600 and GFW 0600-1000) that use air for positive displacement from the mold (pneumatic molding equipment).

Previous forming approaches for producing shelf stable aggregate foods are unsuitable for making a shelf stable aggregate food with low binder content, as provided herein. For example, methods that employ cutting a formed, hardened slab of aggregate work well for aggregate foods with high binder content because large amounts of binder can withstand forces applied to particulates by the cutter that cause strain on the binder. However, with low binder content, cutting can result in significant breakage as the cutter applies force to particulates in the food, causing strain on the binder and breaking the binder in an uncontrollable manner. In addition, when a moist aggregate with low binder content described herein is slabbed onto a surface with a roller to produce a slab for cutting and baking, adhesion to the roller can overcome cohesion within the slab and/or adhesion to a carrier surface, causing problems, such as breaks in the slab, transfer to the roller rather than the carrier surface, uneven slab thickness, and the like. A roller used to slab a moist aggregate with force sufficient to result in cohesion within the slab that overcomes adhesion to the roller can cause undesired crushing and/or grinding of particulates during forming.

Methods for forming shelf stable baked goods are also unsuitable for making a shelf stable aggregate food with low binder content, as provided herein. For example, standard rotary molding that fills molds on a primary roller and relies on adhesion and/or friction from a secondary roller for removal from the mold can be used for moist doughs with high cohesiveness. However, standard rotary molding is generally unsuitable for molding moist aggregates, regardless of binder content. This is because binders that have not hardened do not typically provide enough cohesiveness to hold an aggregate together to ensure complete removal from a rotary mold. In addition, rotary molding of an aggregate type food often results in crushing or grinding of particulates.

A moist aggregate can be formed into any desired shape, such as a bar, a disk, a ball, a cube, or the like. Shape and size of a formed moist aggregate can be adjusted based on desired serving size or visual appeal. Die design for a selected positive displacement machinery can be adjusted to achieve a desired form. In some embodiments, a moist aggregate can be formed into pieces that range from about 3 mm to about 15 mm in thickness.

After forming, the structure of hydrated dairy powder or hydrated maltodextrin powder in moist aggregate pieces is set to form a binder that binds the particulates together in the shelf stable food. A structure of a hydrated dairy powder or hydrated maltodextrin powder can generally be set by heating and/or reducing moisture content of the hydrated dairy powder or hydrated maltodextrin powder. Any appropriate method can be used to set structure of a hydrated dairy powder or hydrated maltodextrin powder, including frying, baking, or low temperature dehydration methods. Preferred methods balance time and temperature, such that the structure is set relatively quickly to prevent significant absorption of water by any permeable particulates. Baking is particularly suitable for setting a structure of a hydrated dairy powder or hydrated maltodextrin powder to form a binder. Particularly suitable baking conditions can range from about 5 minutes to about 15 minutes at a temperature of about 250° F. to about 360° F. (e.g., up to about 330° F. for a dairy binder, and up to about 360° F. for a maltodextrin binder). In some embodiments, when a hydrated dairy powder is included in a moist aggregate, a temperature of less than 315° F. can be used to prevent excessive browning during baking, especially for a dairy binder. It is to be understood that a broader range of times and temperatures can be suitable for baking a moist aggregate provided herein, depending on a number of factors, such as size of the moist aggregate pieces, type of binder, desired appearance, flavor profile, final moisture content, and the like, so long as the structure of the hydrated powder is set to form a binder that binds the particulates together and imparts a crispy or crunchy texture to the resulting shelf stable food.

A shelf stable food provided herein can be packaged in any suitable manner. For example, a shelf stable food can be packaged as individual servings or in multi-serving packaging. In some embodiments, packaging with low moisture and/or gas permeability can be used. In some embodiments, packaging can be used that is designed to reduce crushing or breaking of a shelf stable food.

EXAMPLES

Example 1—Shelf Stable Foods with Dairy Binder

Various moist aggregates were made by combining the particulate and dairy powder ingredients in Table 1 to make coated particulates, and then combining the coated particulates with water and any oil, if used. Moist aggregate was formed and baked at 300° F. for 10 minutes to form a shelf stable food. In some cases, flavorants were added, typically as dry ingredients (e.g., flaked or powdered herbs, spices, salts, and the like) in the coated particulates.

TABLE 1

| Sample | Dairy Powder | Dairy Powder Amount (% total weight moist aggregate) | Impermeable Particulate Amount (% total weight moist aggregate) | Permeable Particulate Amount (% total weight moist aggregate) | Oil Amount (% total weight moist aggregate) | Water Amount (% total weight moist aggregate) |
|---|---|---|---|---|---|---|
| 1 | Parmesan cheese powder | 10-15% | 45-60% | 15-30% | 0% to 3% | 5-10% |
| 2 | Parmesan cheese powder | 10-15% | 65-80% | 0% | 0-3% | 5-10% |
| 3 | Parmesan cheese powder | 10-15% | 10-15% | 40-60% | 0-3% | 5-10% |
| 4 | 50:50 parmesan:cheddar cheese powder | 10-15% | 45-60% | 15-30% | 0-3% | 5-10% |
| 5 | NFDM/ yogurt powder | 10-15% | 45-60% | 15-30% | 0-3% | 5-10% |

Figure 2:
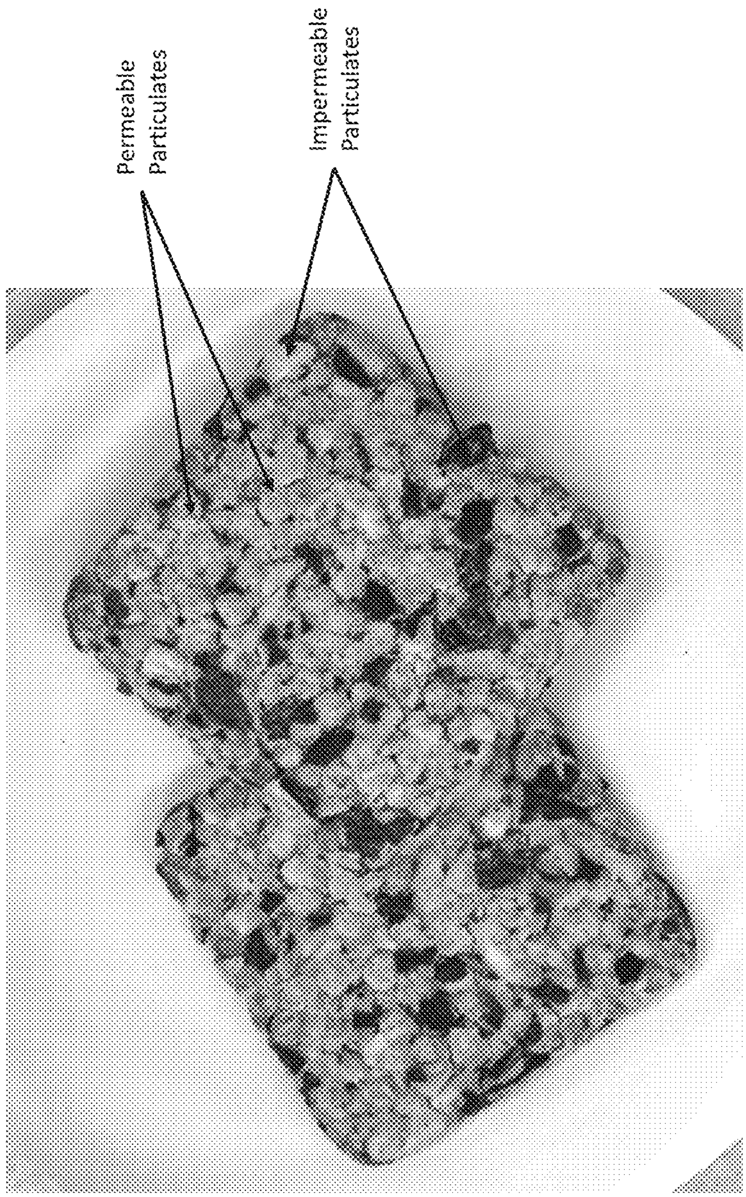
FIG. 2 is a picture of an embodiment of a shelf stable food provided herein, which includes a nonfat dry milk (NFDM) binder. The food is formed as a wafer, with two of them shown, and has visible impermeable particulates (nut and seed pieces) and permeable particulates (protein crisps) with little visible binder.

Moist aggregates of the samples in Table 1 could be readily formed. Samples 1 (FIG. 1), 4, and 5 (FIG. 2) were tested using both piston molding and a pneumatic molding equipment, and successfully produced molded moist aggregate that could be baked to produce a sufficiently sturdy and enjoyable shelf stable food. Based on handling properties, it is expected that samples 2 and 3 could also be molded using positive displacement equipment. Sample 2, containing no permeable particulates, remained somewhat moist after baking, which could be addressed by reducing the amount of binder while still producing an acceptable product. Sample 3 could be formed and baked, but the product was fragile. This could be addressed by increasing the amount of binder to achieve an acceptable product.

Additional samples were tested, and it was found that sample where the amount of hydrated dairy powder (dairy powder+water content) was 10% or less by weight of moist aggregate, after baking the final product was fragile and had little cheese flavor if cheese powder was used as the dairy powder. In samples including at least some permeable particulates where the amount of hydrated dairy powder was 30% or greater by weight of moist aggregate, after baking the final product was perceived as being wet and lacked a crisp texture. Generally, it was found that a particularly good texture in the final product was achieved in samples that included permeable particulates with a moist aggregate that contained similar amounts by weight of permeable particulates and hydrated dairy powder.

Example 2—Shelf Stable Food with Maltodextrin Binder

Various moist aggregates were made by combining the particulate and maltodextrin powder ingredients, as well as any sugar ingredients, in Table 2 to make coated particulates, and then combining the coated particulates with water and any oil, if used. Moist aggregate was formed and baked at 340° F. for 10 minutes to form a shelf stable food.

TABLE 2

| Sample | Maltodextrin Powder Amount (% total weight moist aggregate) | Sugar Amount (% total weight moist aggregate) | Impermeable Particulate Amount (% total weight moist aggregate) | Permeable Particulate Amount (% total weight moist aggregate) | Oil Amount (% total weight moist aggregate) | Water Amount (% total weight moist aggregate) |
|---|---|---|---|---|---|---|
| 6 | 5-10% | 0% | 60-70% | 10-20% | 0-3% | 5-10% |
| 7 | 5-10% | 5-10% | 50-60% | 10-20% | 0-3% | 5-10% |

Figure 3:
FIG. 3 is a picture of an embodiment of a shelf stable food provided herein, which includes a maltodextrin binder. The food is formed as a crispy stick, and has visible impermeable particulates (nut and seed pieces) and permeable particulates (rolled oats and soy crisps) with little visible binder.

Moist aggregates of the samples in Table 2 could be readily formed. Sample 7 was tested using both piston molding and pneumatic molding equipment, and successfully produced molded moist aggregate that could be baked to produce a sufficiently sturdy and enjoyable shelf stable food. Based on handling properties, it is expected that sample 6 could also be molded using positive displacement equipment. Samples 6 and 7 produced sturdy, acceptable product, which had a more crunchy texture and was more sturdy than samples made with a dairy binder. Sample 6 had a somewhat bland flavor profile, which could be addressed with stronger flavorants. Sample 7 (FIG. 3) had a crispier, more preferable texture to sample 6 due to inclusion of some sugar.

The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A method of making a shelf stable food, the shelf stable food having a shelf life at room temperature of at least 1 month and comprising:

a. combining an amount of maltodextrin powder with particulates to form powder coated particulates;

b. combining the powder coated particulates with an amount of water to form a moist aggregate, the moist aggregate including:

i. the particulates in an amount of from about 50% to about 75% by weight of the moist aggregate;

ii. a hydrated maltodextrin powder having a moisture content of 30% to 70%, wherein the moist aggregate comprises from about 4% to about 15% maltodextrin by weight;

c. forming the moist aggregate into pieces using a positive displacement molding method; and d. setting the structure of the hydrated maltodextrin powder to form a maltodextrin binder in the shelf stable food, the shelf stable food including the particulates in an amount of about 65% to about 85% by weight of the shelf stable food with the maltodextrin binder binding the particulates together and comprising about 15% to about 35% by weight of the shelf stable food.

2. The method of claim 1, wherein the maltodextrin binder contributes less than 10% sugar by weight of the shelf stable food.

3. The method of claim 1, wherein the moist aggregate comprises from about 4% to about 8% maltodextrin by weight.

4. The method of claim 1, wherein the amount of water is from about 5% to about 10% by weight of the moist aggregate.

5. The method of claim 1, wherein the step of setting the structure includes baking the pieces.

6. The method of claim 5, wherein the step of setting the structure includes baking the pieces at a temperature of about 275° F. to about 375° F. for a time of about 5 minutes to about 15 minutes.

7. The method of claim 1, wherein the positive displacement molding method comprises piston molding.

8. The method of claim 1, wherein combining the amount of maltodextrin powder with the particulates to form the powder coated particulates comprises combining at a rate of about 9% to 20% maltodextrin powder by weight of the powder coated particulates to about 80% to 91% particulates by weight of the powder coated particulates.

9. The method of claim 1, wherein the powder coated particulates consist of the particulates and a coating wherein the coating consists essentially of: a) the maltodextrin powder or b) the maltodextrin powder and a sugar.

10. The method of claim 1, wherein combining the amount of maltodextrin powder with the particulates includes directly combining the maltodextrin powder with the particulates.

* * * * *